A. BERGHOLD & T. FORSTNER.
Corn-Planter.

No. 208,668. Patented Oct. 8, 1878.

Witnesses:
J. J. Masson
D. P. Cowl

Inventors:
Alexander Berghold
and Thomas Forstner
by E. E. Masson atty

UNITED STATES PATENT OFFICE.

ALEXANDER BERGHOLD, OF NEW ULM, AND THOMAS FORSTNER, OF SIGEL-TOWN, MINNESOTA.

IMPROVEMENT IN CORN-PLANTERS.

Specification forming part of Letters Patent No. 208,668, dated October 8, 1878; application filed July 18, 1878.

*To all whom it may concern:*

Be it known that we, ALEXANDER BERG-HOLD, of New Ulm, and THOMAS FORSTNER, of Sigeltown, both in the county of Brown and State of Minnesota, have invented certain new and useful Improvements in Corn-Planters; and that the following is a full, clear, and exact description of the same, reference being had to the accompanying drawings, making a part of this specification, in which—

Figure 1:
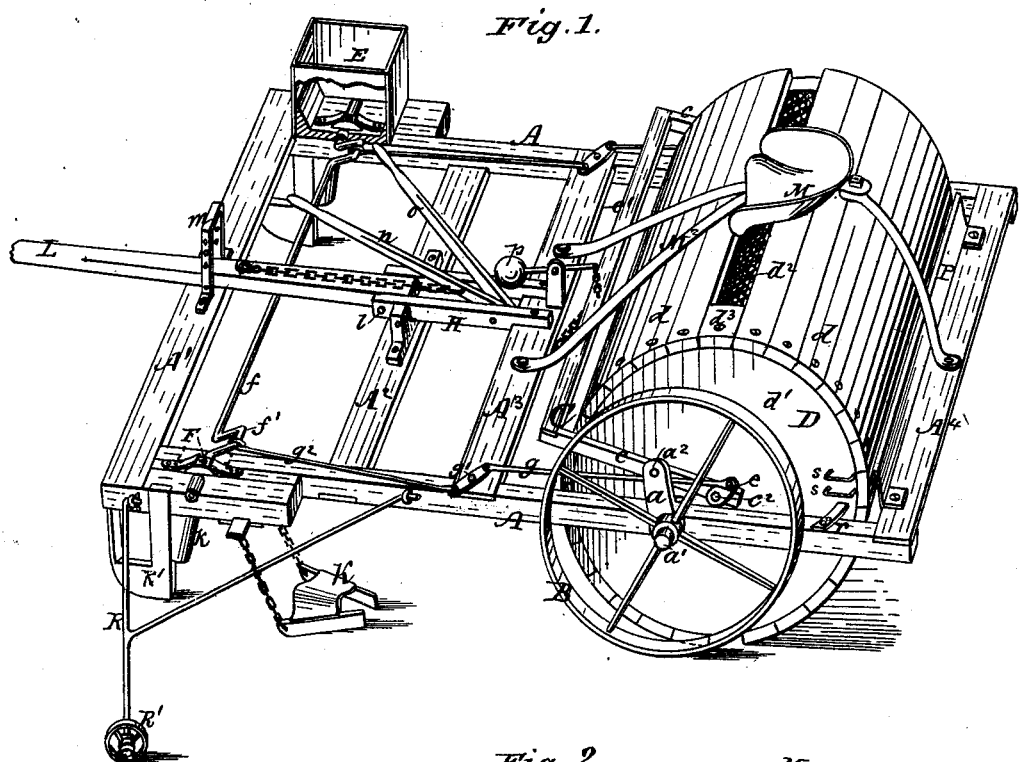
Figure 2:
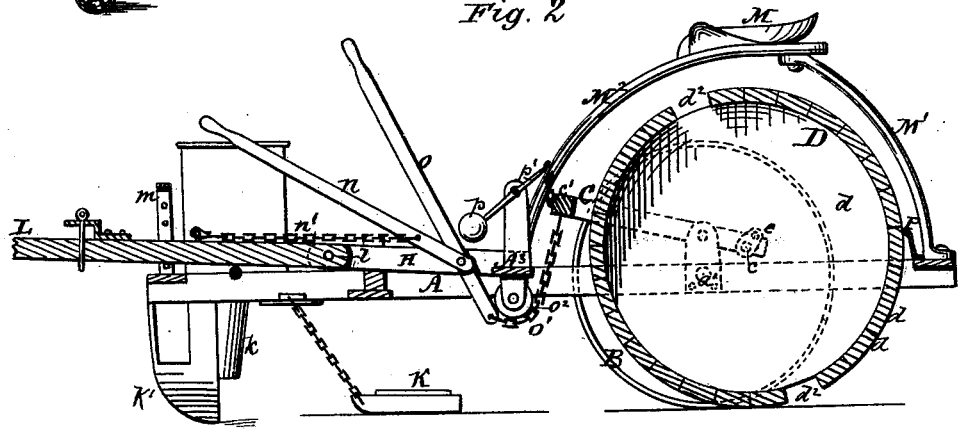
Figure 3:
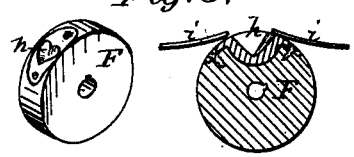
Figure 4:
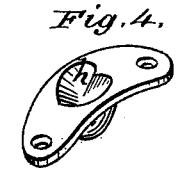

Figure 1 represents the corn-planter in perspective. Fig. 2 represents the same in longitudinal vertical section. Fig. 3 represents, in perspective and section, one of the seed-wheels. Fig. 4 represents the pocket used with the seed-wheels.

Our invention relates to that class of corn-planters in which the machine is used not only to plant the corn, but to roll the field, mark the rows, and check-row them at the same time.

Our invention consists in the combination of a main frame supported on two wheels, and carrying the seed-boxes, the corn dropping, covering, and other devices, with a secondary frame pivoted to the main frame, and carrying a single roller, grooved longitudinally, and extending the whole width of the frame, by which means a field can be rolled, marked, and planted at one operation.

It also consists in the driver's seat located above said main roller, and in the ringing-indicator attached to the main frame adjoining to one end of the roller, to inform the driver when the planting is effected.

It also consists in devices to regulate the width marked for the rows.

In the drawings, the main frame is composed of two longitudinal pieces, A, and transverse planks $A^1$, $A^2$, $A^3$, and $A^4$. To the side pieces, A, are bolted the castings or standards $a$, from the lower part of which project outwardly the short axles $a^1$ for the broad-tread wheels B, that thus support the main frame.

From the upper part of each casting $a$ a pin, $a^2$, projects inwardly, upon which is pivoted a lever, $c$, and the two levers $c$ are united at their forward end by a brace or bar, $c^1$, the three pieces forming the secondary frame, C. To the rear end of the levers $c$ is pivoted, at $c^2$, the large roller D. This roller has a diameter of about twenty-eight inches, and is larger than the wheels B. It is made hollow, out of parallel staves $d$ and heads $d^1$, the latter being provided at their center with short axles, journaled at $c^2$ to the levers $c$. One of the staves of the roller is removed from opposite sides, as shown at $d^2$, to leave ridges upon the otherwise rolled ground in check-rowing a field.

The length of the groove $d^2$, or space between the rows, can be indicated and regulated by means of a short stave, $d^3$, inserted in one end of the groove.

The seed-boxes E (of which only one is shown in Fig. 1) are placed on the fore part of the main frame. Each one contains a seed-wheel, F, mounted on the same axle $f$, that is oscillated by means of cranks $f'$, connected with the axle of the large roller D, as follows: To one or both ends of the axle of the large roller is attached a short crank or eccentric, $e$, that revolves with it, and to said crank is attached a rod, $g$, that connects, by means of a horizontally-oscillating lever, $g^1$, and another rod, $g^2$, with the swinging arm or crank on the axle of the seed-wheels, and transmits it less than a half-revolution for every half-revolution of the large roller.

Each seed-wheel F is provided with a removable metallic conical and heart-shaped pocket, $h$, having flanges by which it can be secured to the periphery of the seed-wheel, and upon which rest two blunt springs, $i$, one at each end of the opening, to level the contents of the seed-pockets.

The pockets $h$ can be made of various sizes to receive more or less grains of corn. Under each seed-wheel is placed the delivery-spout $k$, in the rear of the hoe $k'$, and dragging on the ground in the rear of it is the corn-coverer K.

The driver's seat M is placed over the large roller, and in the rear of the axle of the wheels, so that the driver, in inclining backward, can raise the front of the planter. The seat M is supported in front upon braces $M^2$, resting on the transverse plank $A^3$, and in the rear upon a brace, $M^1$, resting on the transverse plank $A^4$.

The hounds for the tongue are attached to the transverse planks $A^2$ and $A^3$. The tongue L is pivoted to the hounds H at $l$, and passes under a yoke, $m$, provided with holes, through which pins or bolts can pass to retain the forward end of the tongue at any desired height.

Two levers, $n$ and $o$, are placed between and pivoted to the hounds. The lever $n$ is connected by a chain, $n'$, with the tongue, so that if the driver pulls upon it, and at the same time inclines forward, it will cause the hoes to sink deeper in the ground, and if the driver inclines backward while holding the lever it will lift the hoes clear off the ground, as it is desirable at the end of the field. The lever $o$ extends under the hounds, and is connected by a chain, $o^1$, passing under a pulley, $o^2$, with the front part of the frame C, so that if the driver pulls upon it, or presses with one of his feet upon the bar $c^1$, the latter will be depressed and the roller lifted off the ground when turning at the end of a field, or to bring one of its grooves $d^2$ in line with one of the ridges left on the ground at a previous passage. Both levers $n$ and $o$ can be provided with latches to lock them in position upon circular racks.

The roller D, by its own weight, will generally remain on the ground; but to assist it there is mounted on the frame a weight, $p$, on one end of a pivoted lever, $p'$, and the other end is attached to the bar $c^1$ of the roller-frame.

To indicate to the driver the moment when the corn is dropped, there is connected to the machine a sounding device formed of a spring, $r$, attached to the main frame, and two staples, $s$, driven into the end of the roller. The spring, being in the track of the staples, will be raised by the first and received by the second, causing a ringing sound at every or alternate dropping of the seed.

In the rear of the roller, and attached to the rear plank, $A^4$, there is a scraper, P, to remove any earth that may adhere to the roller.

To the side-pieces, A, of the frame there is hinged a braced rod, R, carrying at the end of it a wheel, R', to roll upon the ground in the track of the previously planted and marked corn, and keep the machine on a line parallel with it.

Having now fully described our invention, we claim—

1. In combination with the main frame supported on two wheels and carrying the seed-boxes, and a secondary frame pivoted to standards upon the sides of the main frame, the single roller D, extending the whole width of the frame, grooved longitudinally, and provided with adjustable markers $d^3$, substantially as and for the purpose described.

2. In combination with a corn-planter having a main frame supported on two wheels, a secondary frame pivoted to standards attached to the main frame, and a grooved roller extending the whole length of said frame, the driver's seat M, located over said roller, with lever $n$ pivoted to the hounds to raise or depress the front of the machine, and the lever $o$ and bar $c^1$ to raise the roller off the ground, substantially as and for the purpose described.

3. In combination with the main frame of a corn-planter supported on two wheels, and a grooved roller mounted on a secondary frame, the ringing attachment composed of a spring, $r$, attached to the main frame, and two staples, $s$, upon the end of the roller, substantially as and for the purpose described.

ALEXANDER BERGHOLD.
THOMAS FORSTNER.

Witnesses:
FRANCIS BAASEN,
W. O. MUSSER.